United States Patent [19]

Hunter et al.

[11] 4,330,513

[45] May 18, 1982

[54] CATALYTIC FUME INCINERATION

[75] Inventors: William K. Hunter, Kildeer; Leslie C. Hardison, Barrington; Edward J. Dowd, Palatine, all of Ill.

[73] Assignee: Air Resources, Inc., Palatine, Ill.

[21] Appl. No.: 215,322

[22] Filed: Dec. 11, 1980

Related U.S. Application Data

[63] Continuation of Ser. No. 12,325, Feb. 15, 1979, abandoned, which is a continuation of Ser. No. 731,987, Oct. 13, 1976, abandoned.

[51] Int. Cl.³ ............................................. B01D 53/36
[52] U.S. Cl. .................................. 423/245; 423/210; 423/240; 252/411 R; 252/465; 422/139; 422/145; 422/177
[58] Field of Search .................. 423/210, 212 C, 212, 423/213.2, 240, 245, DIG. 13; 252/411 R, 448, 465; 422/139, 145, 168, 177

[56] References Cited

U.S. PATENT DOCUMENTS

| | | | |
|---|---|---|---|
| 2,605,234 | 7/1952 | Friedman | 252/411 R |
| 2,620,314 | 12/1952 | Hockstra | 252/448 X |
| 2,746,936 | 5/1956 | Plank | 252/465 |
| 2,747,976 | 5/1956 | Houdry | 423/212 C |
| 3,086,839 | 5/1963 | Bloch | 423/212 C |
| 3,190,840 | 6/1965 | Biais et al. | 252/465 |

Primary Examiner—Earl C. Thomas
Attorney, Agent, or Firm—Merriam, Marshall & Bicknell

[57] ABSTRACT

Industrial fumes or waste gases containing combustible noxious materials are preheated and passed upwardly through a bed of particulate oxidation catalyst comprising chromic oxide on alumina or other suitable inert support. Catalytic combustion of the combustible materials is effected, and the pollutant-free gas is discharged to the atmosphere. The particle size of the catalyst is relatively coarse, and the gas velocity is sufficient to agitate or fluidize the bed. The hardness of the catalyst is such that only limited attrition occurs, which assists in keeping the catalyst surface clean, and the catalyst loss in the effluent gas is less than one pound per million standard cubic feet of gas treated.

10 Claims, 3 Drawing Figures

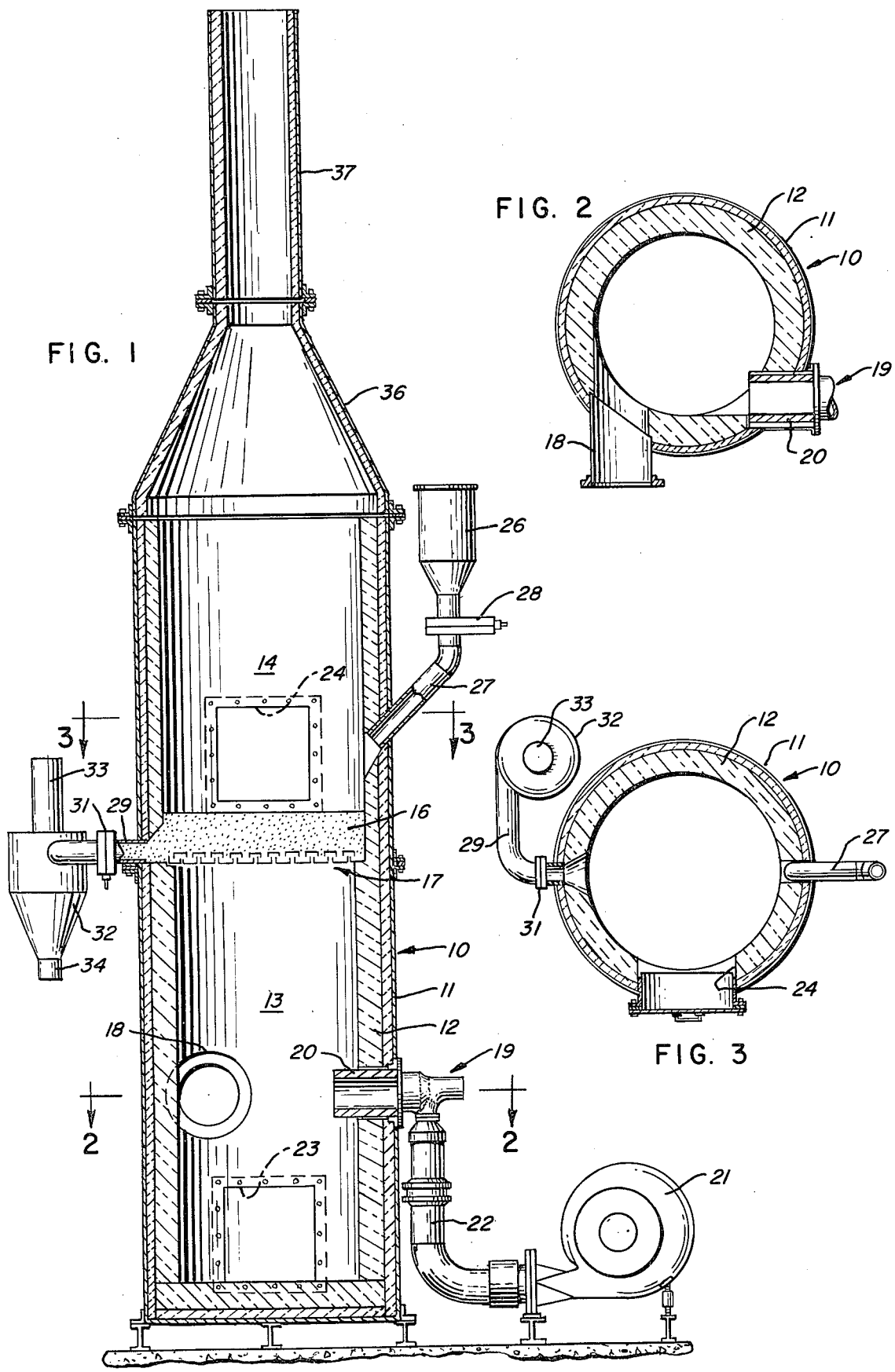

CATALYTIC FUME INCINERATION

This is a continuation of application Ser. No. 12,325, filed Feb. 15, 1979, now abandoned which is a continuation of application Ser. No. 731,987, filed Oct. 13, 1976, now abandoned.

This invention relates to a novel and improved process for the catalytic incineration of fumes and waste gases containing combustible noxious materials, particularly organic pollutants such as hydrocarbons and the like.

Various processes are known for treating industrial fumes and waste gases to effect oxidation of combustible materials. For example, fixed bed catalytic incineration has been widely used to control organic emissions by means of precious metal catalyst elements prepared by depositing platinum and/or palladium on heat resistant alloy ribbons, as disclosed in the Suter et al U.S. Pat. Nos. 2,658,742 and 2,720,494. Other fixed catalysts have been used in which the precious metal is supported on a ceramic carrier. However, the precious metal catalysts heretofore used have serious limitations because of their high susceptibility to suppression of catalytic action by halogen, phosphorous, silicon, and sulfur compounds as well as to poisoning by heavy metals and other deleterious materials commonly found in industrial fumes and waste gases. Moreover, such catalysts are prone to fouling, as by coatings of heavy hydrocarbons or tars, which neccessitates costly shutdowns for catalyst replacement or regeneration.

To avoid such catalyst problems those skilled in the art have often resorted to thermal incineration in spite of the higher temperatures required and the higher fuel costs as compared with catalytic incineration. The higher temperatures necessary for thermal incineration also entail serious design problems and often require the use of more costly materials of construction.

The present invention overcomes the aforementioned problems by utilizing an agitated or fluidized bed of a relatively coarse particulate oxidation catalyst which does not contain a precious metal. As will appear hereinafter, the non-precious metal catalyst is physically rugged and thermally stable over a broad range of operating conditions. In addition, because the use of precious metals is avoided, the catalyst has superior resistance to catalyst suppressants and poisons with excellent stability and catalyst life. The agitated or fluidized condition of the catalyst bed also minimizes deactivation problems due to fouling or coating of the catalyst. The activity of the catalyst bed can be maintained during operation of the process by addition of fresh catalyst and removal of used catalyst without costly shutdown of the system.

In the accompanying drawing,

FIG. 1 is a vertical sectional view of an illustrative apparatus for practicing the invention; and FIGS. 2 and 3 are horizontal cross-sectional views taken along the lines 2—2 and 3—3 of FIG. 1, respectively.

As shown in the drawing, the apparatus comprises an elongated vertical reactor 10 comprising an exterior metal shell 11 of circular cross-section and an internal heat resistant lining 12 of refractory material. The reactor 10 has a lower preheat zone 13 and an upper catalyst zone 14. In the lower portion of the zone 14 a bed 16 of particulate solid catalyst is supported on a gas distribution and support grid shown schematically at 17. The grid 17 may have any suitable construction well known in the catalytic conversion art for preventing the movement of catalyst particles downwardly therethrough into the zone 13 while at the same time permitting gas to flow upwardly through the grid and distributing the gas flow uniformly through the catalyst bed.

An inlet 18 for the waste gas to be treated is provided in the zone 13, and a burner 19 having a nozzle 20 is mounted adjacent the inlet 18 so that the waste gas introduced through the inlet 18 commingles with and is preheated by the hot combustion gases from the burner nozzle 20. The burner 19 is supplied with fuel and air from a blower 21 through a conduit 22. An access opening 23 with a removable door is provided in the lower preheat zone 13, and a similar access opening 24 is provided in the upper zone 14 immediately above the catalyst bed 16.

An external catalyst supply hopper 26 is connected to zone 14 of the reactor for gravity feed of fresh catalyst through an inclined supply line 27 having an outlet above the catalyst bed 16. A slide valve or gate shown schematically at 28 controls the rate of catalyst feed. Used catalyst is removed from the bottom of the bed 16 through an outlet pipe 29 having a control valve shown schematically at 31. The output pipe 29 communicates with an external cyclone separator 32 having an upper gas outlet 33 and a lower solids outlet 34. A conical transition section 36 is mounted at the upper end of the zone 14 and connects to a stack 37 through which the pollutant-free effluent gases are discharged to the atmosphere.

The non-precious metal oxidation catalyst used in the present invention comprises a mixture of a minor portion by weight of chromic oxide ($Cr_2O_3$) and a major portion by weight of a suitable carrier or support which is substantially inert at normal operating temperature. The preferred carrier or support is alumina, but other well known carriers or supports may be used such as silica and silica-alumina mixtures. In some cases, especially in the case of a silica carrier or support, the addition of a suitable clay binder may be desirable, e.g., kaolin, bentonite, attapulgite, or the like. Preferably, the catalyst consists essentially of from about 15% to about 25% by weight chromic oxide, the balance being alumina or other carrier or support. For purposes of the present invention it is desired that the catalyst have a relatively coarse particle size so as to avoid the need for cyclone separators or other separating means for recovering catalyst fines while at the same time permitting a high gas velocity and flow rate through the catalyst bed. In general, the particle size of the catalyst may be within the range of from about 500 microns up to about ¼ inch, and preferably the particle size should be substantially uniform.

Although the catalyst can be prepared by any of the conventional techniques well known in the hydrocarbon conversion catalyst art, it is preferred to provide the catalyst in relatively large preformed shapes, e.g., by pelletizing or extruding the carrier or support to form spheres, tablets, pellets, extrudate, or the like, and then impregnating with aqueous chromic acid, drying and calcining. Alternatively, an extrudable mixture of the carrier or support in aqueous chromic acid may be extruded, followed by drying and calcining. Preferably, the catalyst particles have a substantially uniform composition throughout. Particularly good results are obtained with the extruded catalyst, and although somewhat smaller or larger dimensions can be used, an extrudate of about ⅛ inch diameter is preferred with the length of the extruded pieces being from about ⅛ inch to about ⅜ inch.

An important characteristic of the catalyst for purposes of the present invention is that it is hard, mechanically strong, and highly resistant to abrasion so that it undergoes only a limited by beneficial degree of attrition during normal use in the process. One test commonly used in the catalyst art to measure strength and attrition resistance is the Humble Erosion test, and values of less than 3% are regarded as generally satisfactory for fluid bed use. Another test which may be used is the Standard Oil of Indiana test, and attrition values of less than 12% are considered satisfactory under this test. The catalyst used in the present invention meets either of these laboratory criteria but also satisfies a much stricter practical requirement in commercial use, as described below.

In the customary fluidized bed catalyst operation the catalyst particles have a size distribution ranging from relatively fine to relatively coarse, and the gas or vapor upward velocity is such that a lower turbulent dense phase is formed which resembles a boiling liquid with an upper light or disperse phase containing the smallest size particles. Under these conditions cyclone separators, electrostatic precipitators, or other suitable separation devices must be provided to separate the fine catalyst particles from the light phase for return to the system, thereby avoiding excessive catalyst loss from the system. In the present invention, however, the catalyst particle size is relatively coarse to begin with, and because of the hardness and attrition resistance of the catalyst, there is a minimum degree of formation of fines such that cyclone separators or the like are unnecessary and the catalyst loss from the system is restricted to less than one pound of catalyst per million standard cubic feet of gas treated. The limited amount of catalyst attrition that occurs during the process is beneficial in that the self-abrading action of the moving catalyst particles in the bed keeps the surfaces of the particles relatively clean thereby providing protection against fouling or deactivation of the catalyst due to surface deposits, e.g. coatings of heavy hydrocarbons. When the catalyst particles have a substantially uniform composition throughout, the catalyst activity remains substantially unchanged as the particles are abraded and worn away to expose new surface areas.

With the relatively coarse particle size of the catalyst in the present invention, fluidization of the catalyst bed in the strict sense of a turbulent dense phase resembling a boiling liquid is not always achieved and, in fact, is not necessary. Instead, an upward gas velocity sufficient to lift or agitate the catalyst particles at the point of incipient fluidization is adequate, so that the bed may be described as agitated or fluidized. Thus, the gas velocity is preferably at or slightly above the threshold velocity for fluidization with only a moderate pressure drop across the bed. It has been found that a relatively shallow bed of catalyst is desirable so that the pressure drop across the bed is less than one pound per square inch and preferably from about 2 to about 10 inches water column. More specifically, a static bed depth of from about 2 to about 24 inches, preferably from about 6 to about 12 inches, is used with the face velocity of the gas being from about 1 to about 10 standard cubic feet per second per square foot, preferably from about 2.5 to about 5 standard cubic feet per second per square foot.

The gas hourly space velocity may range from about 1000 to about 50,000, with 18,000 being a typical value.

In the preheat zone 13 the inlet waste gas containing combustible materials is heated by the burner 19 and raised to the required temperature to initiate catalytic combustion of the combustible components, e.g. from about 500° to about 1000° F. Although not shown in the drawing, the inlet gas to the reactor 10 may be preheated, if desired, by heat exchange with the effluent stream from the stack 37 in order to reduce the load on the burner. Also, if desired, the burner 19 may be operated solely with secondary air in the waste gas stream being treated when the latter contains sufficient oxygen. The pressure in the reactor 10 is ordinarily at about atmosphere pressure, but higher or lower pressures may be used.

The heated gases pass upwardly through the grid support 17 and the catalyst bed 16, the gas velocity being sufficient to agitate or fluidize the bed. However, as discussed above, fluidization in the strict sense is not required as long as the gas velocity is sufficient to lift and agitate the catalyst particles. Combustion of the combustible components is effected in the catalyst bed 16 and continues in the zone 14. The pollutant-free gaseous products of the process are discharged to the atmosphere through the stack 37, the loss of catalyst fines from the system being less than one pound per million standard cubic feet of gas treated, as previously explained.

In order to maintain the catalyst activity and to compensate for the slight catalyst loss, fresh catalyst may be added to the system from the supply hopper 26 and used catalyst may be removed through the cyclone separator 32. The addition and removal of catalyst may be accomplished intermittently or continuously, as desired, without interrupting the operation of the process.

Thus, the invention permits the control of organic emissions at lower temperatures and with lower fuel cost than conventional thermal or flame incineration techniques. The catalyst and process conditions overcome the problems of fouling, activity suppression, and poisoning associated with the precious metal catalysts heretofore used in catalytic incineration. The non-precious metal catalyst used in the present invention has sufficient activity to compete favorably with commercially available precious metal catalysts but its cost is low enough to permit the catalyst to be discarded when depleted. The invention is useful in the treatment of a wide variety of industrial fumes or waste gases containing noxious combustible materials, particularly hydrocarbons or other organic materials, but the invention finds particular application in food processing operations, coating and other solvent handling processes, and chemical manufacture. The process is particularly useful in the oxidation of halogeneated organic compounds, such as vinyl chloride, because of the unique immunity of the non-precious metal catalyst to halogen suppression.

The following specific examples are presented for purposes of further illustrating the invention but not by way of limitation.

EXAMPLE 1

An extruded chromic oxide-alumina catalyst is prepared as follows:

Dried alumina ($Al_2O_3$) is prepared by any one of a number of techniques well known in the industry. For example, sodium aluminate is reacted with a suitable reagent to cause precipitation with the resultant formation of aluminum hydroxide gel. Alternatively, a suitable alkali such as ammonium hydroxide is added to an aluminum salt such as aluminum sulfate or aluminum chloride in an amount sufficient to form aluminum hydroxide. Upon drying and calcining, the aluminum hydroxide is converted to alumina.

The alumina is mulled with the slow addition of water until the moisture content is approximately 50% and the consistency of the mulled alumina is appropriate for extrusion. The alumina is then extruded through a ⅛ inch die and the extruded pieces about ⅛ to ⅜ inch long are dried on a tray or belt dryer followed by calcination of from 1-4 hours at a temperature of between 900° F. and 1400° F. The calcined extrudate is characterized by high surface area and high porosity.

The extruded particles are impregnated with a 50% aqueous solution of chromic acid at a temperature of about 120° F. The impregnated extrusions are then dried at 250° F. followed by calcining at 1300° F. in a rotary kiln to form chromium oxide in a concentration of between 15 and 25% by weight of the final product.

EXAMPLE 2

The catalyst prepared according to Example 1 was used in the pilot treatment of fumes from a vinegar manufacturing plant containing ethyl alcohol, acetic acid, and related organic emissions. The apparatus was substantially like that shown in the drawing, and the catalyst bed containing 225 pounds of catalyst was about 3 feet in diameter with a static bed depth of about 8 inches.

The heated gas was passed through the catalyst bed at a velocity of about 1001 standard cubic feet per minute and the pressure drop across the bed was about 7.9 inches water column. The face velocity through the bed was about 2.45 standard cubic feet per second per square foot which was sufficient to agitate the bed. The catalyst bed temperature was typically about 640° F.

Using a combustible detector, the concentration of organic materials in the inlet and outlet gas was 330 parts per million and 28 parts per million, respectively, which corresponds to a conversion efficiency of 91.5%. The outlet was substantially odor-free, and in a series of twelve tests over a six week period the catalyst loss was negligible.

We claim:

1. A process for the catalytic incineration of an industrial waste gas containing organic emissions or other combustible materials, comprising:

providing an elongated vertical reactor having a lower zone containing a burner, an upper zone, a vertically unrestrained catalyst bed of coarse, attrition-resistant, particulate oxidation catalyst supported in said reactor between said lower and upper zones, catalyst addition means for introducing fresh catalyst to said upper zone above said bed, and catalyst withdrawal means for removing used catalyst from said bed;

said catalyst comprising an effective amount of chromic oxide and a carrier or support and having a particle size within the range of from about 500 microns to about ¼ inch and said bed having a static depth of from about 2 to 24 inches;

introducing the gas into said lower zone and preheating the gas therein by said burner;

passing the preheated gas at a temperature of from about 500° F. to about 1000° F. upwardly from said lower zone through said catalyst bed to said upper zone;

regulating the upward flow of said gas through said catalyst bed to achieve a face velocity within the range of about 1 to about 10 standard cubic feet per second per square foot and a pressure drop across said catalyst bed of less than 1 pound per square inch, said velocity being sufficient to agitate or fluidize said catalyst bed but insufficient to cause any substantial transfer of catalyst particles out of said reactor, the upward flow of said gas being the sole means of effecting agitation or fluidization of said bed; and discharging the treated gas from said upper zone without separation of catalyst therefrom, the hardness and attrition resistance of said catalyst being such that the loss of catalyst fines in the treated gas discharged from said upper zone is less than one pound per million standard cubic feet of gas treated;

the activity of said catalyst bed being maintainable by feeding fresh catalyst to said upper zone above said bed by said catalyst addition means and by removing used catalyst from said bed by said catalyst withdrawal means, without interrupting the operation of the process.

2. The process of claim 1 in which said catalyst is prepared by forming particles of alumina having a substantially uniform size within the range of 500 microns to ¼ inch, calcining said particles at a temperature of about 900°-1400° F. for about 1-4 hours, impregnating said particles with an aqueous solution of chromic acid, said solution having a concentration of chromic acid sufficient to produce in the final product a concentration of about 15% to 25% by weight of chromic oxide, drying the impregnated particles, and calcining said particles at a temperature of about 1300° F.

3. The process of claim 1 further characterized in that said catalyst comprises from about 15% to about 25% by weight chromic oxide.

4. The process of claim 3 further characterized in that the balance of said catalyst comprises an alumina carrier or support.

5. The process of claim 1 further characterized in that said catalyst is in the form of preformed shaped particles having a substantially uniform composition.

6. The process of claim 5 further characterized in that said catalyst is an extrudate.

7. The process of claim 6 further characterized in that said extrudate has a diameter of about ⅛ inch and the length of the extruded pieces is from about ⅛ to about ⅜ inch.

8. The process of claim 1 further characterized in that the static depth of said bed is from about 6 to about 12 inches.

9. The process of claim 1 further characterized in that the velocity of said gas through said bed is substantially at or slightly above the threshold fluidization velocity.

10. The process of claim 1 further characterized in that said face velocity is from about 2.5 to about 5 standard cubic feet per second per square foot.

* * * * *

UNITED STATES PATENT AND TRADEMARK OFFICE
CERTIFICATE OF CORRECTION

PATENT NO. : 4,330,513

DATED : May 18, 1982

INVENTOR(S) : WILLIAM K. HUNTER ET AL.

It is certified that error appears in the above-identified patent and that said Letters Patent are hereby corrected as shown below:

Col. 3, line 7 "by" should be --but--.

Col. 4, line 55, "halogeneated" should be --halogenated--.

Signed and Sealed this

Thirty-first Day of August 1982

[SEAL]

Attest:

GERALD J. MOSSINGHOFF

Attesting Officer     Commissioner of Patents and Trademarks